United States Patent [19]

Hausinger

[11] Patent Number: 4,561,322

[45] Date of Patent: Dec. 31, 1985

[54] MOTOR VEHICLE TRANSMISSION

[75] Inventor: Otto Hausinger, Gerlingen, Fed. Rep. of Germany

[73] Assignee: Dr. Ing. h.c.F. Porsche Aktiengellschaft, Fed. Rep. of Germany

[21] Appl. No.: 601,963

[22] Filed: Apr. 19, 1984

[30] Foreign Application Priority Data

Apr. 21, 1983 [DE] Fed. Rep. of Germany ....... 3314411

[51] Int. Cl.⁴ .............................................. G05G 9/18
[52] U.S. Cl. .................................. 74/475; 74/473 R; 74/476
[58] Field of Search ...................... 74/473 R, 475, 476, 74/477

[56] References Cited

U.S. PATENT DOCUMENTS 2,800,033  7/1957  Zittrell ............................. 74/475 X
2,931,243  4/1960  Magg .................................. 74/473
4,104,929  8/1978  Kessmar ........................... 74/473 R
4,222,281  9/1980  Mylenek ...................... 74/473 R X Primary Examiner—A. Michael Chambers
Assistant Examiner—John C. Fox
Attorney, Agent, or Firm—Craig & Burns

[57] ABSTRACT

A motor vehicle transmission which consists of a change-speed transmission and of an axle gear, is made usable by a special configuration and arrangement of the gear-shifting mechanism without modification for front engine and rear engine drive. For that purpose, the shifting rods disposed horizontally one above the other of the individual transmission speeds are operable by way of the shifting fingers of a vertically arranged shifting lever which is pivotally connected with the also horizontally disposed shifting shaft which is inserted into the change-speed transmission housing either at the bottom or at the top.

15 Claims, 10 Drawing Figures

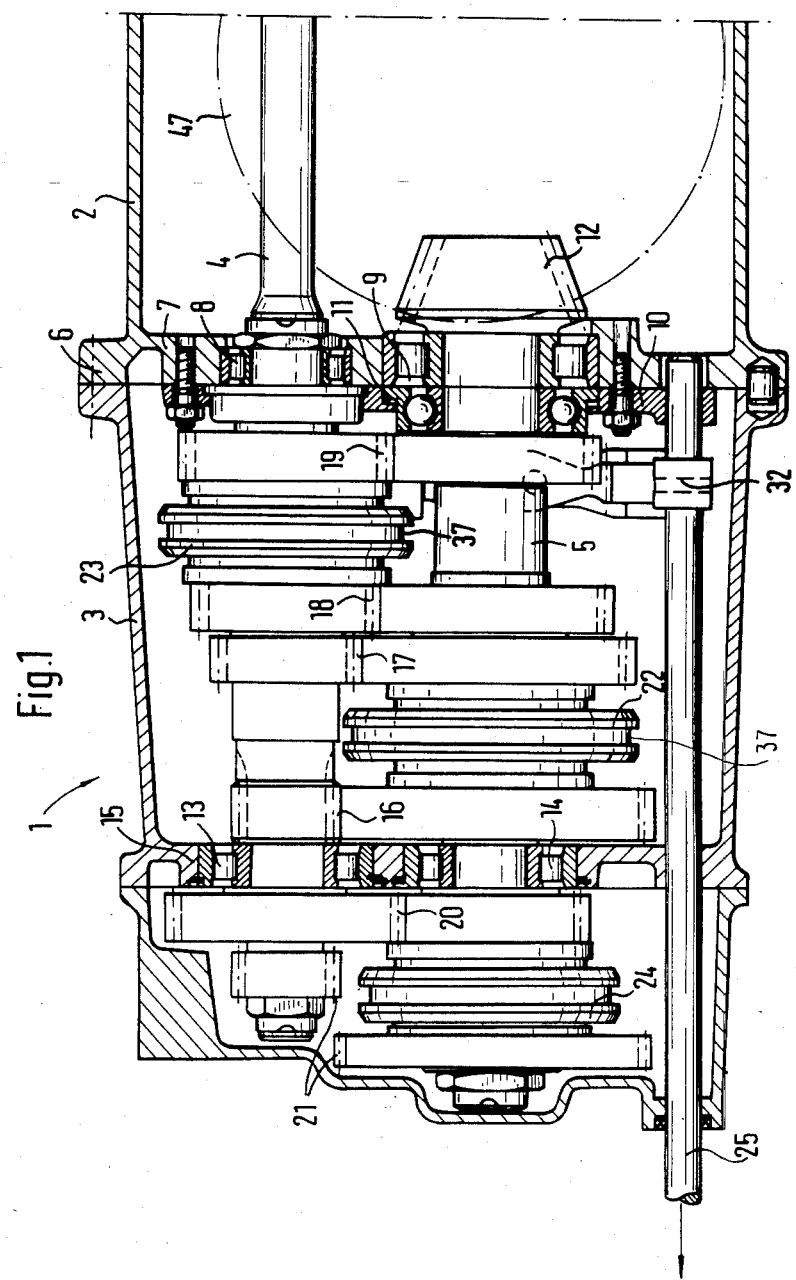

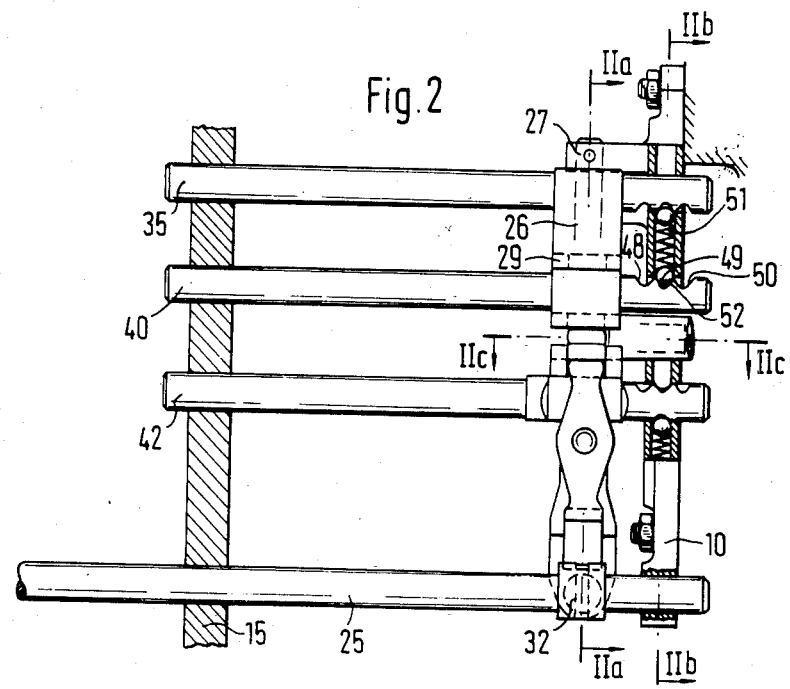
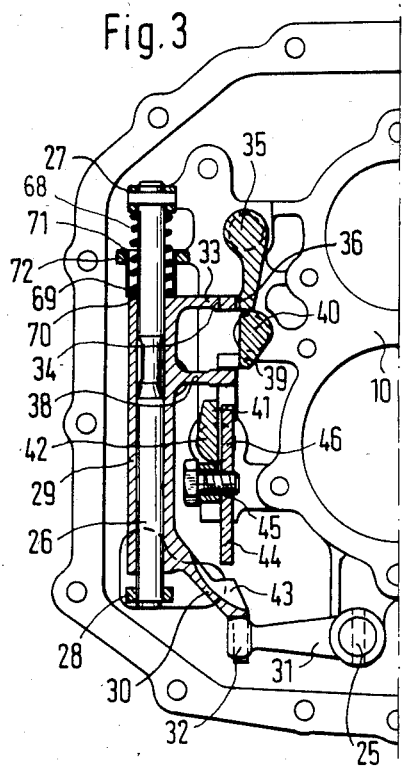

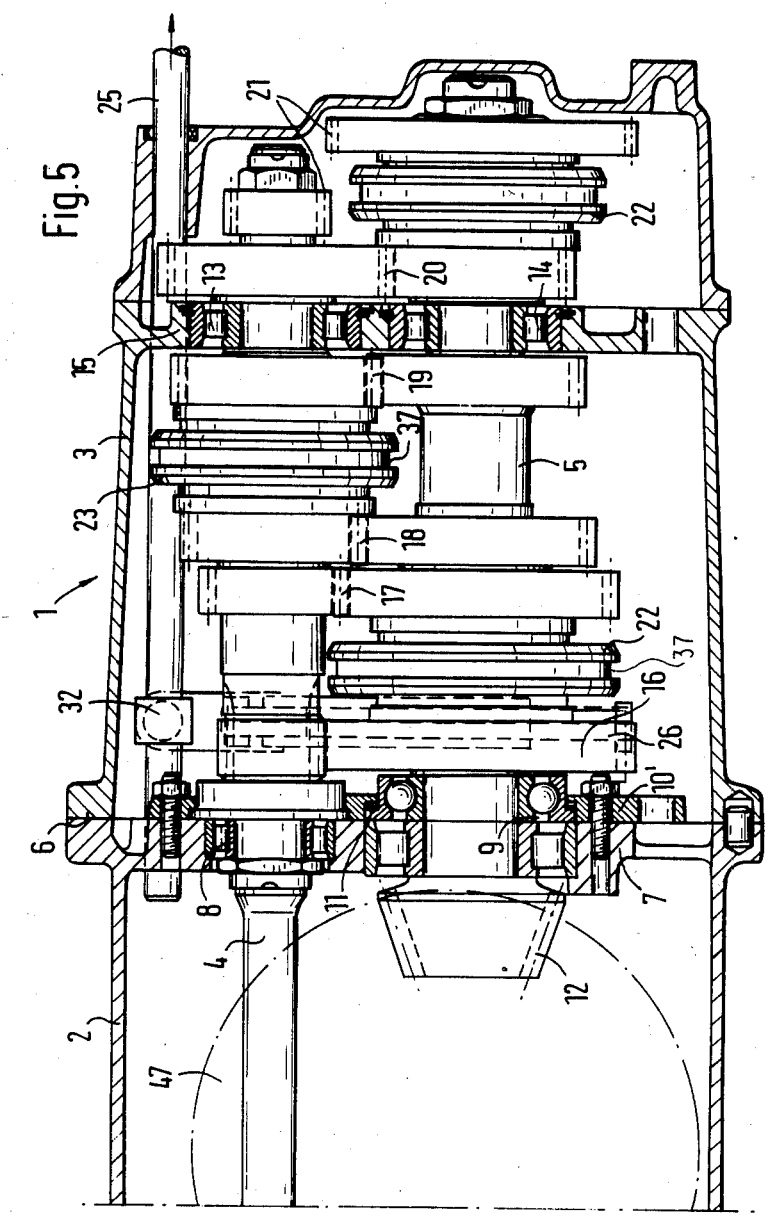

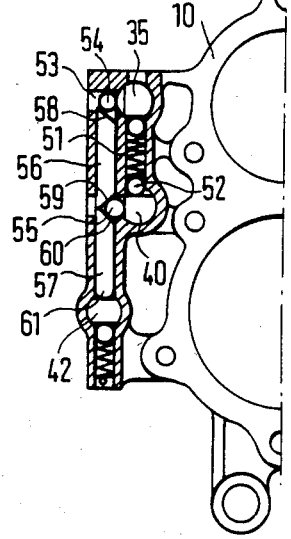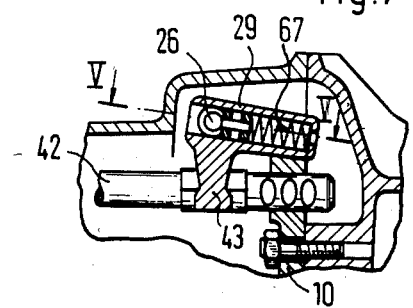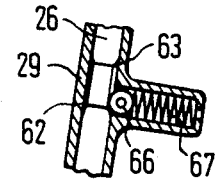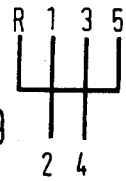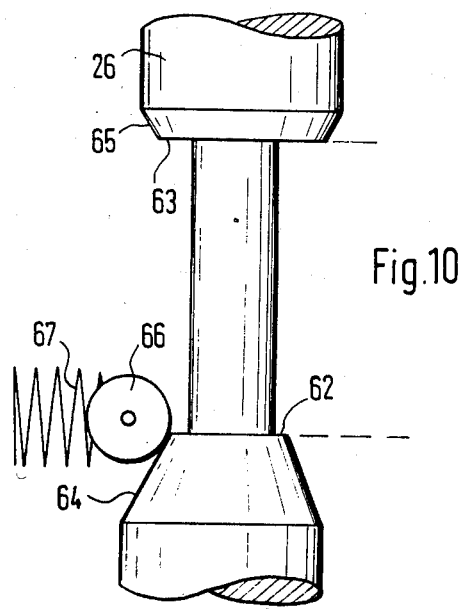

MOTOR VEHICLE TRANSMISSION

The present invention relates to a motor vehicle transmission which consists of a change-speed transmission and of an axle gear, whereby shifting rods coordinated to the transmission speeds are supported horizontally in the housing of the change-speed transmission in parallel to the input shaft driven by the engine and to the output shaft driving a vehicle axle.

Such a motor vehicle transmission is disclosed in the German Auslegeschrift No. 12 17 218. A partition wall is formed in the common housing of an axle gear and of a change-speed transmission, which receives one bearing of the output shaft and of the bevel gear of the axle gear secured in the partition wall end-face. The bearing together with output shaft and bevel gear can be axially displaced by means of a bearing flange whose distance to the partition wall is adjustable, and thus the surface appearance of the bevel gear teeth of the axle gear can be adjusted. In order to avoid that the shifting rods disposed in parallel to the output shaft, respectively, the shifting forks screwed together with the shifting rods have to be adjusted anew to the clutch sleeves taken along during the axial displacement, the shifting rods and the blocking means thereof are accommodated in an extension of the bearing flange so that they always partake in the axial displacement.

However, this construction leaves the disadvantage that the shifting shaft which engages by means of shifting fingers in grooves of the shifting rods, is supported in the transmission housing and cooperates directly with the shifting rods. For, if such a transmission which is conceived for the drive by a front engine, is to be used for a rear engine, the transmission housing and the structural parts of the gear-shifting arrangement have to be constructed differently. This makes necessary a double stocking of parts. All other commercially available motor vehicle transmissions entail the same disadvantage.

It is the object of the present invention to so construct and arrange the shifting elements for the speed-shifting arrangement of a motor vehicle transmission that the same transmission can be used both for a front engine drive as also for a rear engine drive.

The underlying problems are solved according to the present invention in that the shifting elements which actuate the shifting rods, are provided at a shifting lever which for the preselection of the shifting lanes is longitudinally displaceably supported on a guide shaft fixed in space and perpendicular to the shifting rods and for the engagement of the speeds, is rotatably supported on the guide shaft, and in that the guide lever is actuatable by a shifting shaft parallel to the shifting rods by way of arms at the guide lever and at the shifting shaft which are jointedly connected with each other. Because the shifting rods are not actuated directly by the shifting shaft, but under interposition of a vertically or horizontally arranged shifting lever, which cooperates by way of shifting fingers with the horizontally arranged shifting rods disposed vertically one above the other, it becomes possible to merely turn the same transmission through 180° when changing from a front engine drive to a rear engine drive. If the shifting shaft thereby enters the change-speed transmission housing once at the top and once at the bottom, then merely a differently constructed shifting lever has to be additionally used which with a vertical arrangement is mounted in one case on the guide shaft from above and in the other case from below.

These and other objects, features and advantages of the present invention will become more apparent from the following description when taken in connection with the accompanying drawing which shows, for purposes of illustration only, one embodiment in accordance with the present invention, and wherein:

FIG. 1 is a longitudinal cross-sectional view through a five-speed motor vehicle transmission for rear engine drive in accordance with the present invention;

FIG. 2 is an elevational view of the arrangement of the shifting shaft and of the shifting rods with a spring-loaded speed retaining locking mechanism in accordance with the present invention;

FIG. 3 is a cross-sectional view taken along line IIa—IIa of FIG. 2, illustrating the bearing clamping plate in accordance with the present invention with a rear engine drive;

FIG. 4 is a cross-sectional view, similar to FIG. 3, illustrating the bearing clamping plate in accordance with the present invention with a front engine drive;

FIG. 5 is a longitudinal cross-sectional view through a five-speed motor vehicle transmission for front engine drive in accordance with the present invention;

FIG. 6 is a cross-sectional view taken along line IIb—IIb of FIG. 2;

FIG. 7 is a cross-sectional view taken along line IIc—IIc of FIG. 2;

FIG. 8 is a cross-sectional view taken along line V—V of FIG. 7;

FIG. 9 is a shifting diagram of a five-speed, four-lane shifting arrangement; and FIG. 10 is a partial, somewhat schematic view, on an enlarged scale, of the preselector lane-blocking mechanism in accordance with the present invention.

Referring now to the drawing wherein like reference numerals are used throughout the various views to designate like parts, an input or drive shaft 4 starting from a rear engine (not shown) and in parallel thereto an output shaft 5 leading to the axle drive are supported in a transmission housing generally designated by reference numeral 1 which is composed of an axle gear housing 2 and of a change-speed transmission housing 3. The axle gear housing 2 is bolted together with the change-speed transmission housing 3 at a flange connection 6 and is provided at this place with a partition wall 7 which contains a bearing 8 of the input shaft 4 and a bearing 9 of the output shaft 7. These bearings 8 and 9 are retained by means of a bearing clamping plate 10 under interposition of spacer disks 11 and are displaceable in the longitudinal direction for the adjustment of a bevel gear 12 secured end-face on the output shaft 5. The two other bearings 13 and 14 of the input shaft 4 and of the output shaft 5 are arranged in a partition wall 15 of the change-speed transmission housing 3.

To the right of the partition wall 15 (FIG. 1) are disposed, in the following sequence, the gear pairs 16, 17, 18 and 19 for the first, second, third and fourth speed. The gear 20 for the fifth speed and the gear pair 21 for the reverse speed are arranged to the left of the partition wall 15. The gear pairs of the forward speeds which are in meshing engagement, consist each of a fixed gear and of a loose gear and are engageable by synchronizing clutches 22, 23 and 24 coordinated thereto. The shifting movement is introduced into the transmission by a shifting shaft 25 manually actuated by way of a gear-shifting lever (not shown), whereby the shifting shaft 25 is longitudinally displaceable and rotatably supported in the change-speed transmission housing 3 as well as in the bearing clamping plate 10.

A guide shaft 26 (FIG. 2) is secured at the bearing clamping plate 10 in bearing lugs 27 and 28 which serve at the same time as abutments for a tubularly-shaped shifting lever 29 longitudinally and rotatably guided on the guide shaft 26. An arm 30 which is cast integral with the shifting lever 29 at one end thereof, is connected with an arm 31 of the shifting shaft 25 by way of a ball joint 32. A shifting finger 33 is cast integral with the other end of the shifting lever 29 which engages in a groove 34 (FIG. 3) of a shifting nose 36 provided on a shifting rod 35 in order to displace the same longitudinally. The third speed can be engaged thereby by means of the shifting rod 35 by way of a shifting fork pinned thereto which engages in an annular groove 37 of the synchronizing clutch 22 in one end position while the fourth speed can be engaged in the other end position thereof.

A second shifting finger 38 is able to engage in one longitudinal position of the shifting lever 29 in a groove or notch of a shifting nose 39 which is provided on a shifting rod 40 for the first and second speed. In the other longitudinal position of the shifting lever 29, the shifting finger 38 engages in the groove of a shifting nose 41 which is secured at a shifting rod 42 of the fifth speed. For engaging the reverse speed, a shifting finger provided at the arm 30 engages at a lever arm 44 (FIG. 3) of a guide bar 45 supported at the bearing clamping plate 10, whose other lever arm 46 cooperates with the shifting rod 42.

Since this speed preselection and speed-engaging actuation which includes the parts 25 to 46, is mounted on the bearing clamping plate 10, it partakes in every adjusting movement of the bearing clamping plate which is necessary in order to adjust the bevel gear surface appearance between the bevel gear 12 and the axle drive bevel wheel 47 of the axle gear. The shifting rods which engage in the annular grooves of the shifting sleeves of the synchronizing clutches, may be pinned to the shifting rods since after the adjustment of the bevel gear surface appearance, they need not be adjusted anew relative to the annular grooves.

The gear-shifting actuation described so far serves for a transmission which is connected to a rear engine. The transmission illustrated in FIG. 5 to which belongs the bearing clamping plate 10' according to FIG. 4, is rotated through 180° and is connected with a front engine. The shifting shaft 25 thereby enters the change-speed transmission housing 3 at the top and is supported at the top in the bearing clamping plate 10' which in this case is illustrated thereat of two-partite construction. The shifting lever 29' (FIG. 4) is mounted from above over the guide shaft 26 and is connected by way of its arm 30' with the shifting shaft 25. The shifting lever 29 includes a shifting finger 33' for the engagement of the third and fourth speed, of the first and second speed, as well as of the reverse speed and a second shifting finger 38' for the engagement of the fifth speed. When refitting the transmission from front engine drive to rear engine drive, i.e., when the shifting shaft enters the change-speed transmission housing once from above and once from below, a different shifting lever thus must be used. If this is the case, then the transmission can be used without modification for rear engine and front engine drive. Eyes are cast integrally with the change-speed transmission housing at the bottom and top for the bearing support of the shifting shaft which are through-bored depending on.

As can be seen from FIGS. 2 and 6, also all individual parts of the speed-retaining locking lock-out mechanism, i.e., parts 48 to 53 and of the blocking mechanism, parts 54 to 61, of the shifting rods 35, 40 and 42 are accommodated in the bearing clamping plate 10, respectively, 10'.

For the purpose of retaining the transmission locked in the individual speed positions, the shifting rod 40 is provided with three grooves 48, 49 and 50 (FIG. 2) which cooperate with a detent ball 52 spring-loaded by a spring 51. The detent ball 52 and the spring 51 are disposed in a bore 53 of the bearing clamping plate 10. The groove 48 thereby serves for the elastic locking of the first speed, the groove 49 for fixing the neutral position, the groove 50 for locking the second speed, which, however, can all be cancelled by applying a shifting force. The shifting rods 35 and 42 are provided with similar locking mechanisms.

The blocking lock-out mechanism illustrated in FIGS. 2 and 6, which includes parts 54 to 61, has the purpose to prevent the simultaneous engagement of two speeds. For that purpose, a wedge-shaped groove is provided both at the shifting rod 35 as also at the shifting rod 40; these grooves 35 and 40 cooperate with the blocking balls 54 and 55. The blocking balls 54 and 55 are guided in bores of the bearing clamping plate 10 which are disposed perpendicular to the bore 53.

In parallel to the bore 53 the bearing clamping plate 10 includes a bore in which two blocking pins 56 and 57 are guided. The blocking pin 56 includes at both end faces inclined surfaces 58 and 59 which cooperate with the blocking balls 54 and 55. The blocking pin 57 is provided at one side with an inclined surface 60 cooperating with the blocking ball 55 and at the other end with a rounded-off portion 61 which is adapted to engage in a groove of the shifting rod 42. The operation of the blocking lock-out mechanism is as follows: If the locking pin 57 is moved upwardly along the wedge-shaped groove by actuation of the shifting rod 42, then it presses the blocking ball 55 into the groove of the shifting rod 40 by means of the inclined surface 60. At the same time, the locking pin 56 is also displaced upwardly and locks the shifting rod 35 by way of the ball 54. If one of the two shifting rods 35 or 40 is actuated, then the corresponding blocking ball travels along the groove outwardly and blocks the two other shifting rods by way of the blocking pins and the other blocking ball.

A preselection lane blocking device consisting of parts 62 through 72 is illustrated in FIGS. 7, 8 and 9, which is also accommodated in the bearing clamping plate 10. For that purpose, the guide shaft 26 is provided with a recess which formed by a reduced shaft portion includes on both sides with steps 62 and 63 of larger diameter and passes over into the outer diameter by way of conical turned surfaces 64 and 65. The steps and the conical surfaces cooperate with a roller 66 which is longitudinally movable perpendicular to the guide shaft 26 in a bore of the bearing clamping plate and is supported by a spring 67 (FIG. 8). The smaller step 62 marks the transition to the fifth speed and produces a shifting force of about 35 N. The adjoining conical surface 64 with a more flat inclination serves to produce a return force for pressing back the shifting lever into the neutral position which is located in the shifting plane of the third and fourth speed. The larger step 63 produces a shifting force of about 75 N which is necessary in order to produce a clearly noticeable pressure point during the engagement of the reverse speed. If the shifting lever is moved in the direction of the reverse speed, then a compression spring 68 is also stressed at the same time as the spring 67, which spring 68 is accommodated in a spring pot 69 (FIG. 3) at the end face 70 of the shifting lever 29 and is supported against a bearing lug 27 of the guide shaft 26. The flanged-over rim 71 of the spring pot 69 is held in abutment at a stop 72 of the bearing clamping plate 10.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all those changes and modifications as are encompassed by the scope of the appended claims.

I claim:

1. A motor vehicle transmission with a four-lane shifting arrangement for five forward speeds and a reverse speed for vehicles with a front engine, comprising a change-speed transmission means including housing means and an axle gear means, an input shaft operable to be driven from an engine and an output shaft operable to drive a vehicle axle by way of the axle gear means, shifting rods coordinated to the transmission speeds which are supported substantially horizontally in the housing means substantially parallel to the input shaft and output shaft, and shifting fingers for actuating said shifting rods, said shifting fingers being provided at a shifting lever means, a spatially fixed guide shaft disposed substantially perpendicularly to the shifting rods, said shifting lever means being longitudinally movable supported on said guide shaft for the preselection of the shifting lanes and being rotatably supported thereon for the engagement of the speeds, a shifting shaft disposed sustantially parallel to the shifting rods inserted into the transmission housing means within the upper area thereof, means operatively connecting said shifting shaft with said shifting lever means including arms at the shifting lever means and at the shifting shaft which are pivotally connected with each other, the shifting lever means including a shifting finger for the actuation of the shifting rods of the third and fourth speed, of the first and second speed as well as of the reverse speed and a second shifting finger for the engagement of the fifth speed.

2. A motor vehicle transmission with a four-lane shifting arrangement for five forward speeds and a reverse speed for vehicles with a rear engine, comprising a change-speed transmission means including housing means and an axle gear means, an input shaft operable to be driven from an engine and an output shaft operable to drive a vehicle axle by way of the axle gear means, shifting rods coordinated to the transmission speeds which are supported substantially horizontally in the housing means substantially parallel to the input shaft and output shaft, and shifting fingers for actuating said shifting rods, said shifting fingers being provided at a shifting lever means, a spatially fixed guide shaft disposed substantially perpendicularly to the shifting rods, said shifting lever means being longitudinally movable supported on said guide shaft for the preselection of the shifting lanes and being rotatably supported thereon for the engagement of the speeds, a shifting shaft disposed substantially parallel to the shifting rods inserted into the transmission housing means within the lower area thereof, means operatively connecting said shifting shaft with said shifting lever means including arms at the shifting lever means and at the shifting shaft which are pivotally connected with each other, the shifting lever means including a shifting finger for the actuation of the shifting rod of the third and fourth speed, a second shifting finger for the actuation of the shifting rods of the first and second as well as the fifth speed and a third shifting finger for the engagement of the reverse speed.

3. A motor vehicle transmission, comprising a change-speed transmission means including housing and an axle gear means, an input shaft operable to be driven from an engine and an output shaft operable to drive a vehicle axle by way of the axle gear means, shifting rods coordinated to the transmission speeds which are supported substantially horizontally in the housing means substantially parallel to the input shaft and output shaft, and shifting fingers for actuating said shifting rods, said shifting fingers being provided at a shifting lever means, a spatially fixed guide shaft disposed substantially perpendicularly to the shifting rods, said shifting lever means being longitudinally movably supported on said guide shaft for the preselection of the shifting lanes and being rotatably supported thereon for the engagement of the speeds, a shifting shaft disposed substantially parallel to the shifting rods, means operatively connecting said shifting shaft with said shifting lever means including arms at the shifting lever means and at the shifting shaft which are pivotally connected with each other, wherein thrid and fourth speed is operable to be engaged by means of a first shifting rod, first and second speed is operable to be engaged by means of a second shifting rod and fifth and reverse speed are operable to be engaged by means of a third shifting rod, the third shifting rod being actuatable by way of a rotatably supported double-armed shfiting member, the shifting finger for the reverse speed engaging at one lever arm of said double-armed shifting member and the shifting finger for the fifth speed engaging at the other lever arm thereof.

4. A motor vehicle transmission according to claim 3, wherein by longitudinal movement of the shifting lever means, the lanes for the fifth speed, third and fourth speed, first and second speed, and the reverse speed are sequentially preselectable.

5. A motor vehicle transmission according to claim 4, wherein the guide shaft as pressure point-preselection lane-blocking means is provided with a recess means that includes on both sides thereof steps and passes over into the outer diameter of the guide shaft by way of conical surfaces on both sides thereof, an elastically yielding blocking member of the shifting lever means sliding along said conical surfaces during longitudinal movements thereof and being stressed thereby.

6. A motor vehicle transmission according to claim 5, wherein a small step and conical surface of smaller inclination is coordinated to the transition to the shifting lane of the fifth speed whereas a larger step and conical surface with larger inclination is coordinated to the transition to the shifting lane of the reverse speed.

7. A motor vehicle transmission according to claim 6, wherein the conical surface having a larger inclination produces a shifting force of about 75 N.

8. A motor vehicle transmission according to claim 6, further comprising a spring pot means containing therewithin a compression spring resting with one end thereof against the bottom of the spring pot means, the bottom of the spring pot means being pressed against the end face of the shifting lever means opposite the connection thereof with the shifting shaft, the other end of the compression spring being supported against a bearing stop of the guide shaft whereas the spring pot means includes a flanged rim kept in abutment against a stop of a bearing clamping plate means.

9. A motor vehicle transmission according to claim 6, with a four lane shifting arrangement for five forward speeds and a reverse speed, wherein, for vehicles with front engine, the shifting shaft is inserted into the transmission housing means within the upper area thereof, the shifting lever means including a shifting finger for the actuation of the shifting rods of the third and fourth speed, of the first and second speed as well as of the reverse speed and a second shifting finger for the engagement of the fifth speed.

10. A motor vehicle transmission according to claim 6, with a four-lane shifting arrangement for five forward speeds and a reverse speed, wherein, for vehicles with rear engine, the shifting shaft is inserted into the transmission housing means within the lower area thereof, the shifting lever means including a shifting finger for the actuation of the shifting rod of the third and fourth speed, a second shifting finger for the actuation of the shifting rods of the first and second as well as of the fifth speed and a third shifting finger for the engagement of the reverse speed.

11. A motor vehicle transmission, comprising a change-speed transmission means including housing means and an axle gear means, an input shaft operable to be driven from an engine and an output shaft operable to drive a vehicle axle by way of the axle gear means, shifting rods coordinated to the transmission speeds which are supported substantially horizontally in the housing means substantially parallel to the input shaft and output shaft, and shifting fingers for actuating said shifting rods, said shifting fingers being provided at a shifting lever means, a spatially fixed guide shaft disposed substantially perpendicularly to the shifting rods, said shifting lever means being longitudinally movably supported on said guide shaft for the preselection of the shifting lanes and being rotatably supported thereon for the engagement of the speeds, a shifting shaft disposed substantially parallel to the shifting rods, means operatively connecting said shifting shaft with said shifting lever means including arms at the shifting lever means and at the shifting shaft which are pivotally connected with each other, further comprising a bearing clamping plate means for the bearing support of said input, output and shifting shaft, a speed retaining locking means operable to retain the engaged speed, and blocking means operable to lock out engagement of any other speed when one speed in engaged, the locking means and blocking being accommodated with their operating parts in said clamping plate means.

12. A motor vehicle transmission according to claim 11, with a four lane shifting arrangement for five forward speeds and a reverse speed, wherein, for vehicles with front engine, the shifting shaft is inserted into the transmission housing means within the upper area thereof, the shifting lever means including a shifting finger for the actuation of the shifting rods of the third and fourth speed, of the first and second speed as well as of the reverse speed and a second shifting finger for the engagement of the fifth speed.

13. A motor vehicle transmission according to claim 11, with a four-lane shifting arrangement for five forward speeds and a reverse speed, wherein, for vehicles with rear engine, the shifting shaft is inserted into the transmission housing means within the lower area thereof, the shifting lever means including a shifting finger for the actuation of the shifting rod of the third and fourth speed, a second shifting finger for the actuation of the shifting rods of the first and second as well as of the fifth speed and a third shifting finger for the engagement of the reverse speed.

14. A motor vehicle transmission according to claim 11, wherein the third and fourth speed is operable to be engaged by means of a first shifting rod, the first and second speed is operable to be engaged by means of a second shifting rod and the fifth and reverse speed are operable to be engaged by means of a third shifting rod, the third shifting rod being actuatable by way of a rotatably supported double-armed shifting member, the shifting finger for the reverse speed engaging at one lever arm of said double-armed shifting member and the shifting finger for the fifth speed engaging at the other lever arm thereof.

15. A motor vehicle transmission according to claim 11, wherein by longitudinal movement of the shifting lever means, the lanes for the fifth speed, third and fourth speed, first and second speed, and the reverse speed are sequentially preselectable.

* * * * *